United States Patent
Jung et al.

(10) Patent No.: US 9,928,078 B2
(45) Date of Patent: Mar. 27, 2018

(54) METHOD OF DISPLAYING INFORMATION IN BOOTING, AND ELECTRONIC APPARATUS AND MOBILE TERMINAL USING THE SAME

(71) Applicant: Samsung Electronics Co., Ltd., Suwon-si, Gyeonggi-do (KR)

(72) Inventors: Ji-su Jung, Yongin-si (KR); Young-ah Seong, Seoul (KR); Say Jang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 14/317,784

(22) Filed: Jun. 27, 2014

(65) Prior Publication Data

US 2015/0006875 A1    Jan. 1, 2015

(30) Foreign Application Priority Data

Jun. 28, 2013 (KR) ........................ 10-2013-0075963

(51) Int. Cl.
*G06F 9/00* (2006.01)
*G06F 15/177* (2006.01)
*G06F 9/44* (2018.01)

(52) U.S. Cl.
CPC .................. *G06F 9/4403* (2013.01)

(58) Field of Classification Search
CPC .................................................. G06F 9/4403
USPC ............................................................. 713/2
See application file for complete search history.

(56) References Cited

U.S. PATENT DOCUMENTS

| | | | | |
|---|---|---|---|---|
| 6,473,855 B1* | 10/2002 | Welder | .................. | G06F 9/4401 710/29 |
| 6,996,706 B1* | 2/2006 | Madden | ................. | G06F 9/4406 711/113 |
| 2008/0005697 A1* | 1/2008 | Jung | ................. | G06F 17/30126 715/825 |
| 2008/0010516 A1* | 1/2008 | Lu | ......................... | G06F 9/4401 714/15 |
| 2009/0222636 A1* | 9/2009 | Yano | .................... | G06F 12/0246 711/166 |
| 2010/0229117 A1* | 9/2010 | Lee | ........................ | G06F 9/4418 715/810 |
| 2010/0325409 A1* | 12/2010 | Kim | ...................... | G06F 9/4401 713/2 |
| 2011/0134758 A1* | 6/2011 | Fujisawa | ............. | H04L 63/0227 370/241 |
| 2011/0258049 A1* | 10/2011 | Ramer | .............. | G06F 17/30867 705/14.66 |

(Continued)

FOREIGN PATENT DOCUMENTS

| | | |
|---|---|---|
| KR | 10-2007-0025364 A | 3/2007 |
| KR | 10-2010-0050297 A | 5/2010 |
| KR | 10-2010-0135478 A | 12/2010 |

*Primary Examiner* — Robert Cassity
(74) *Attorney, Agent, or Firm* — Jefferson IP Law, LLP

(57) ABSTRACT

A method of displaying information when an electronic apparatus is booted is provided. The method includes storing specific information, the specific information being monitored and collected from data created when the electronic apparatus operates, in an information file, and executing the information file storing the specific information during booting of the electronic apparatus and displaying the specific information.

13 Claims, 20 Drawing Sheets

(56) References Cited

U.S. PATENT DOCUMENTS

2013/0103936 A1* 4/2013 Tysowski ............ G06F 9/44505
713/2

* cited by examiner

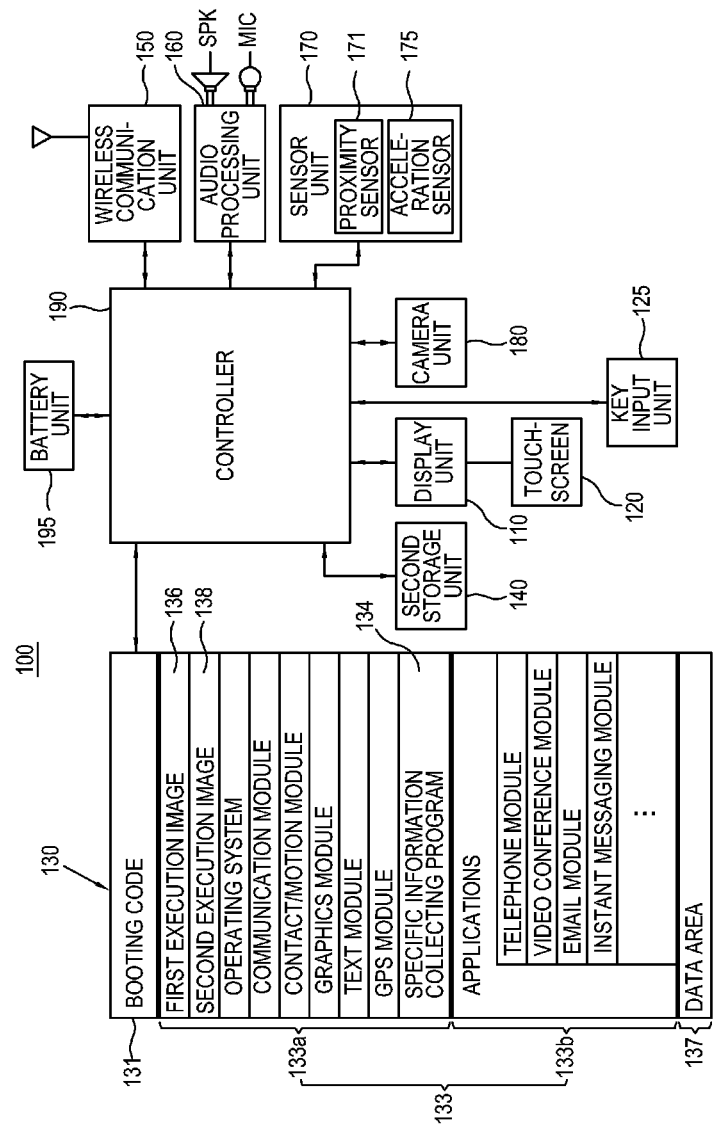

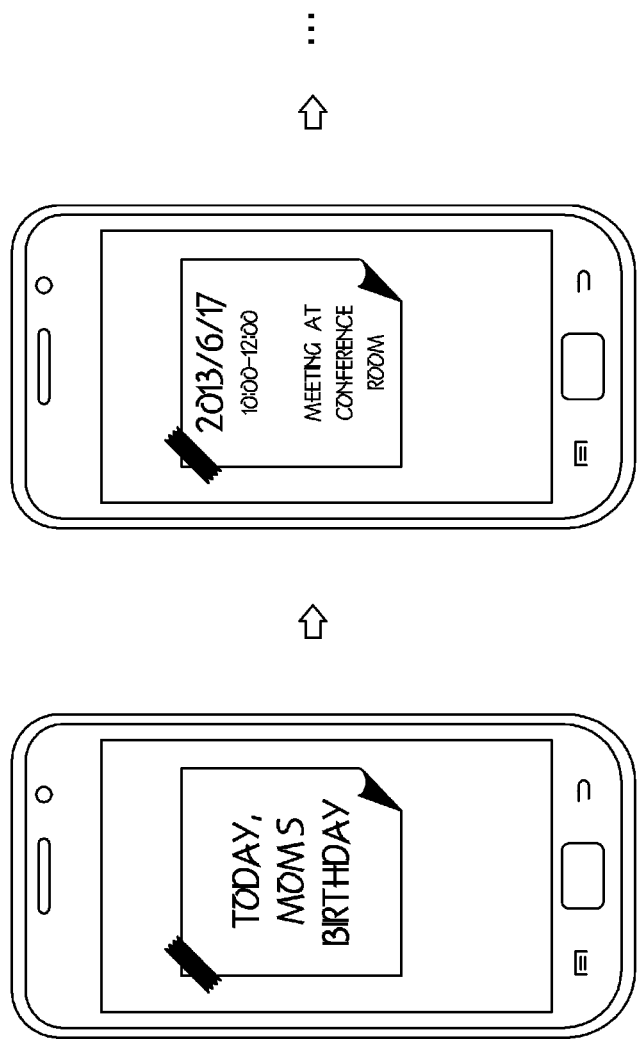

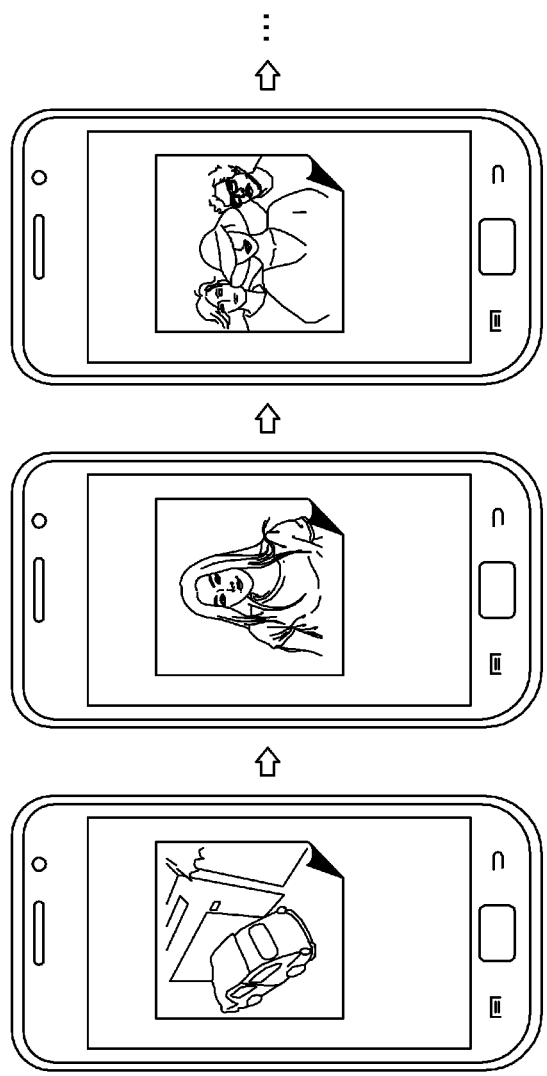

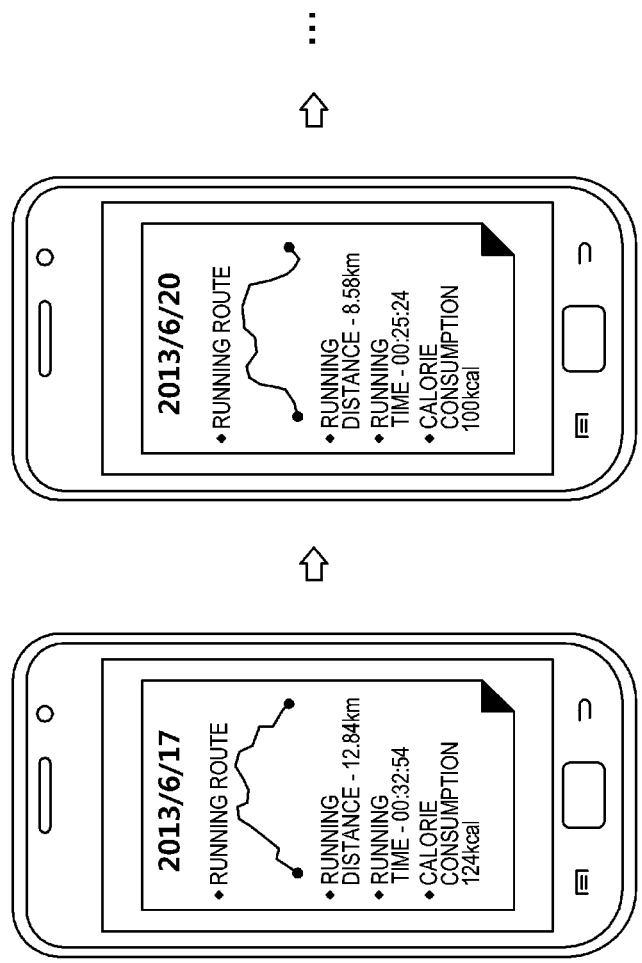

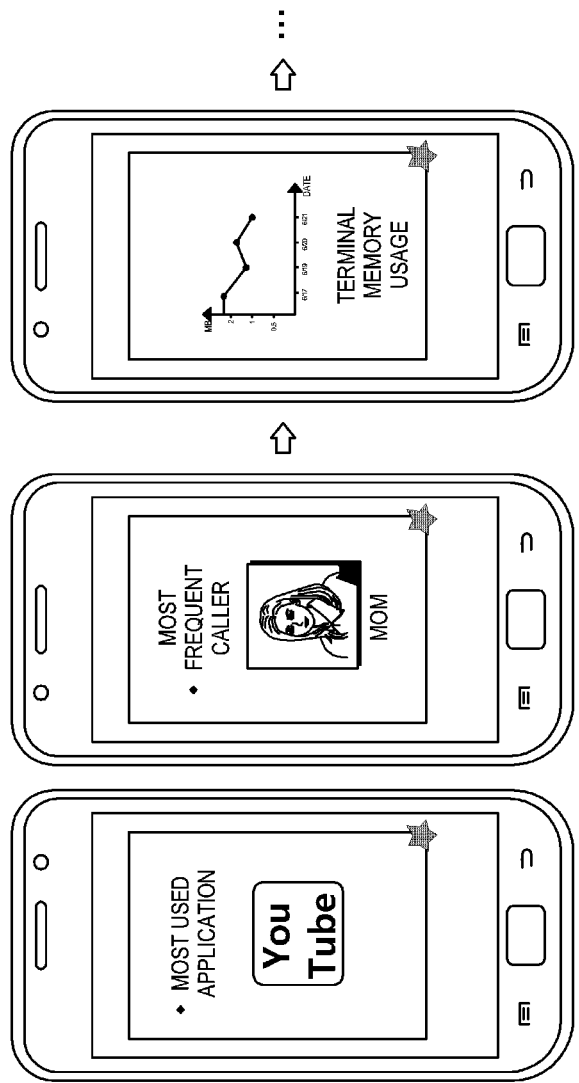

METHOD OF DISPLAYING INFORMATION IN BOOTING, AND ELECTRONIC APPARATUS AND MOBILE TERMINAL USING THE SAME

CROSS-REFERENCE TO RELATED APPLICATION(S)

This application claims the benefit under 35 U.S.C. § 119(a) of a Korean patent application filed on Jun. 28, 2013 in the Korean Intellectual Property Office and assigned Serial number 10-2013-0075963, the entire disclosure of which is hereby incorporated by reference.

TECHNICAL FIELD

The present disclosure relates to a method of displaying information in booting and an electronic apparatus using the same. More particularly, the present disclosure relates to a method of displaying information in booting, which displays specific information monitored and collected while an electronic apparatus operates, instead of related-art information, such as logos of manufacturers or communications service providers, in booting the electronic apparatus including a mobile terminal, such as a smart phone and a tablet Personal Computer (PC), and an electronic apparatus and a mobile terminal using the same.

BACKGROUND

Generally, when an electronic apparatus, including a mobile terminal, such as a smart phone and a tablet Personal Computer (PC) is switched on and booted up, an Operating System (OS) and a variety of applications stored in a flash memory operate. With the advancement of functions, a growing number of applications operate while the mobile terminal is booted up, which, accordingly involves a considerable increase in booting time of the mobile terminal.

For example, it takes about 5 seconds for a smart phone to be completely booted up after pressing a power on switch and to get ready to use so that an initial screen is displayed. Thus, a user may feel bored with waiting for the initial screen to be displayed after pressing the power on switch, without recognizing whether the smart phone is properly booted.

Recently, smart phones display graphic images, such as logos of manufacturers or communications service providers or technician images indicating that booting is in progress, on the screen when booted up. However, since the same graphic images are displayed in booting, a user does not learn how long it takes to finish booting a smart phone and may feel bored until booting the smart phone is done.

Thus, a novel method of estimating how long it takes for a mobile terminal to get ready to use after pressing the power on switch and preventing users from feeling bored with waiting for booting time is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of displaying information in booting which displays specific information monitored and collected as needed by a user when an electronic apparatus operates, instead of information according to the related art such as logos of manufacturers or communications service providers, until an electronic apparatus including a mobile terminal such as a smart phone and a tablet Personal Computer (PC) is booted up and is ready to use, thereby preventing the user from feeling bored with waiting for booting time and providing user-needed information, and an electronic apparatus and a mobile terminal using the same.

Another aspect of the present disclosure is to provide a method of displaying information when booting an electronic apparatus which displays information on progress of a booting process until the electronic apparatus is booted up and is ready to use, thereby enabling a user to estimate how long the user waits for, and an electronic apparatus and a mobile terminal using the same.

In accordance with an aspect of the present disclosure, a method of displaying information when an electronic apparatus is booted is provided. The method includes storing specific information, the specific information being monitored and collected from data created when the electronic apparatus operates in an information file, and executing the information file storing the specific information during booting of the electronic apparatus and displaying the specific information.

In accordance with another aspect of the present disclosure, an electronic apparatus is provided. The electronic apparatus includes a display unit configured to display an image, a storage unit configured to store a booting code and data created when the electronic apparatus operates, and a controller configured to periodically monitor and collect specific information from the stored data, to store the collected specific information in an information file, and to execute the information file storing the specific information according to an executive command of the booting code during booting of the electronic apparatus and to display the specific information on the display unit.

In accordance with another aspect of the present disclosure, a mobile terminal is provided. The mobile terminal includes a display unit configured to display an image, a touch screen disposed in the display unit and configured to generate touch input information in response to a touch manipulation of a user, a communication unit configured to establish a communication channel to an outside, a storage unit configured to store a booting code and data created when the mobile terminal operates, and a controller configured to periodically monitor and collect specific information from the stored data, to store the collected specific information in an information file, and to execute the information file storing the specific information according to an executive command of the booting code during booting of the electronic apparatus and to display the specific information on the display unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above other aspects, features, and advantages of certain embodiments of the present disclosure will be more apparent from the following description taken in conjunction with the accompanying drawings, in which:

FIG. 1 is a block diagram illustrating a configuration of a mobile terminal employing an information display method in booting according to an embodiment of the present disclosure.

FIGS. 4A and 4B illustrate a display form of a selected item in booting in case where a selected item is a User Schedule when setting specific information to display in booting according to an embodiment of the present disclosure.

FIGS. 5A and 5B illustrate a display form of a selected item in booting in case where a selected item is View Photos when setting specific information to display on booting according to an embodiment of the present disclosure.

FIGS. 6A and 6B illustrate a display form of a selected item in booting in case where a selected item is Jogging History when setting specific information to display in booting according to an embodiment of the present disclosure.

FIG. 7 illustrates a display form of a selected item in booting in case where a selected item is Terminal Usage Information when setting specific information to display at booting according to an embodiment of the present disclosure.

Throughout the drawings, it should be noted that like reference numbers are used to depict the same or similar elements, features, and structures.

DETAILED DESCRIPTION

Figure 2A:
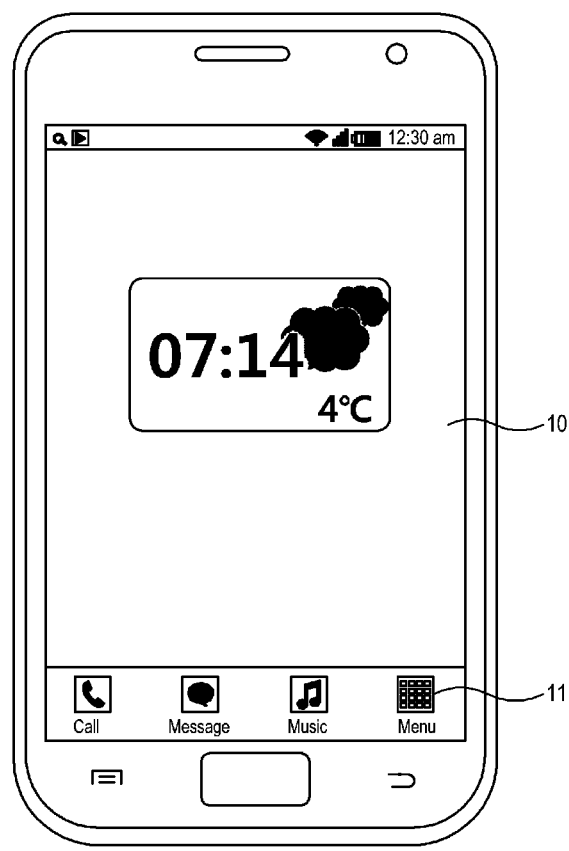
FIGS. 2A, 2B, and 2C illustrate an example of an operation of setting specific information to display when a mobile terminal is booted according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an information display method executed at booting of an electronic apparatus and an electronic apparatus and a mobile terminal using the same according to various embodiments will be described in detail with reference to the accompanying drawings.

An electronic apparatus, according to an embodiment, for example, a mobile terminal, may include any mobile communication terminal operating in accordance with communications protocols corresponding to various communications systems, any information and communications device such as a digital broadcasting player, a Personal Digital Assistant (PDA), a smart phone, a tablet Personal Computer (PC) and a hand-held PC, multimedia equipment and applications thereof.

In the following description, a smart phone will be illustrated as the mobile terminal.

FIG. 1 is a block diagram illustrating a configuration of a mobile terminal employing an information display method in booting according to an embodiment of the present disclosure.

Referring to FIG. 1, a mobile terminal 100 may include a display unit 110, a touchscreen 120, a key input unit 125, a first storage unit 130, a second storage unit 140, a wireless communication unit 150, an audio processing unit 160, a sensor unit 170, a camera unit 180 and a controller 190.

The display unit 110 converts image data into an analog signal to be displayed, the image data including various videos and still images, letters, status information input from the controller 190 while the mobile terminal 100 is operating, and another similar and/or suitable image data that may be displayed by the display unit 110.

That is, the display unit 110 may provide a variety of screens based on uses of the mobile terminal, for example, a lock screen, a home screen, an application execution screen, a menu screen, a write message screen, a call screen, an Internet screen and a keypad screen. The lock screen may be an image displayed when a screen of the display unit 110 is turned on. When a specific user input for unlocking is made, the controller 190 may switch from the displayed lock screen to the home screen or the application execution screen. The home screen may be an image including a plurality of application icons respectively corresponding to a plurality of applications. When a user selects one of the application icons, the controller 190 may execute a corresponding application and switch a displayed image to an execution screen of the application.

The display unit 110 may be a flat display panel, for instance, a Liquid Crystal Display (LCD), an Organic Light Emitting Diode (OLED), an Active Matrix Organic Light Emitting Diode (AMOLED), or any other similar and/or suitable flat display panel. However, the present disclosure is not limited thereto, and the display unit 110 may be a curved display panel or any other similar and/or suitable type of display panel that may be included in the mobile terminal 100.

The touchscreen 120 is formed at a front of the display unit 110, generates a touch event in response to a user manipulation on the touch screen 120, and transmits the touch event to the controller 190. The controller 190 may set permissions to access the mobile terminal 100 in response to the touch event and control corresponding components.

Here, the user manipulation may include a touch, a tap, a double tap, a press, a drag, a drag and drop and a sweep. A touch is a motion of a user pressing a point on the screen; a tap is a motion of touching a point on the screen using a finger and detaching, that is, dropping and/or removing, the finger from the point without moving the finger along the touchscreen 120; a double tap is a motion of tapping a point twice in succession; a press is a motion of touching a point relatively longer than the tap and detaching the finger from the point without moving the finger along the touchscreen 120; a drag is a motion of holding a touch on the screen using a finger while moving the touch in one direction; a drag and drop is a motion of dragging a finger on the screen and detaching the finger from the screen; and a sweep is a motion of quickly moving a finger on the screen like flicking and detaching the finger. Here, the drag is also referred to as a scroll, and the sweep is also referred to as a flick. The controller 190 may distinguish the sweep and the drag based on a moving speed of a gesture.

The touch screen 120 may be provided as a resistive type, a capacitive type, a pressure type, or any other similar and/or suitable type of touch screen for detecting a user's touch.

The key input unit 125 generates a key signal related to control of a function of the mobile terminal 100 and transmits the key signal to the controller 190. The key signal may include power on/off signals, volume control signals and screen on/off signals. To this end, the mobile terminal 100 includes side keys for turning on/off the mobile terminal, controlling the volume and turning on/off the screen at a lateral side of a case or at a front bottom thereof. The controller 190 controls a relevant component and/or executes an operation in response to the key signal.

The first storage unit 130 may store various types of data including a booting code of the mobile terminal 100, an Operating System (OS) and applications to perform a variety of functions. The first storage unit 130 is configured as a flash memory, which is a nonvolatile memory, so as to save data irrespective of supply of power to the mobile terminal 100 and may include a booting code area 131, a program area 133 and a data area 137. The booting code area 131 stores the booting code for booting the mobile terminal 100. The program area 133 may be divided into a first section 133a and a second section 133b. The first section 133a may store the OS for operating each component of the mobile terminal 100 and basic programs, while the second section 133b may store applications.

The basic programs may include, for example, a communication module for supporting a data communication function, a contact/motion module for supporting a touchscreen function, a graphics module for supporting a graphic function, a text module for supporting a text input function and a Global Positioning System (GPS) module for supporting a GPS function, and any other similar and/or suitable modules. The applications may include a telephone module for supporting a call function, a video conference module for supporting video conferencing, an email module for supporting an email function, a browser module (not shown) for accessing an Internet server, an instant messaging module for instant messaging, a camera module for supporting a camera function, a blogging module (not shown) for blogging, an image player module (not shown) for reproducing an image, an image manager module (not shown) for supporting an image managing function, a music player module (not shown) for reproducing a sound, a photo viewer module (not shown) for reproducing a photo, a video player module (not shown) for reproducing a video, a game module (not shown) for a game, a calendar module (not shown) for scheduling, a widget module (not shown) for supporting a widget function, a widget creator module (not shown) for creating a widget, a search module (not shown) for supporting Internet search, and any other similar and/or suitable module.

In particular, the first section 133a may store a specific information collecting program 134, first execution image 136, second execution image 138, and third execution image (not shown), which will be described later. The controller 190 executes the specific information collecting program 134 to periodically monitor and collect data, which will be referred to as "specific information," related to information desired to be displayed on the display unit 110, from among the data stored in the data area 137, when the user boots up the mobile terminal 100, and to store the collected data as the first execution image 136. Further, the controller 190 executes the first execution image 136 to display the specific information related to the collected data on the display unit 110 according to an executive command of the booting code in booting.

Figure 2B:
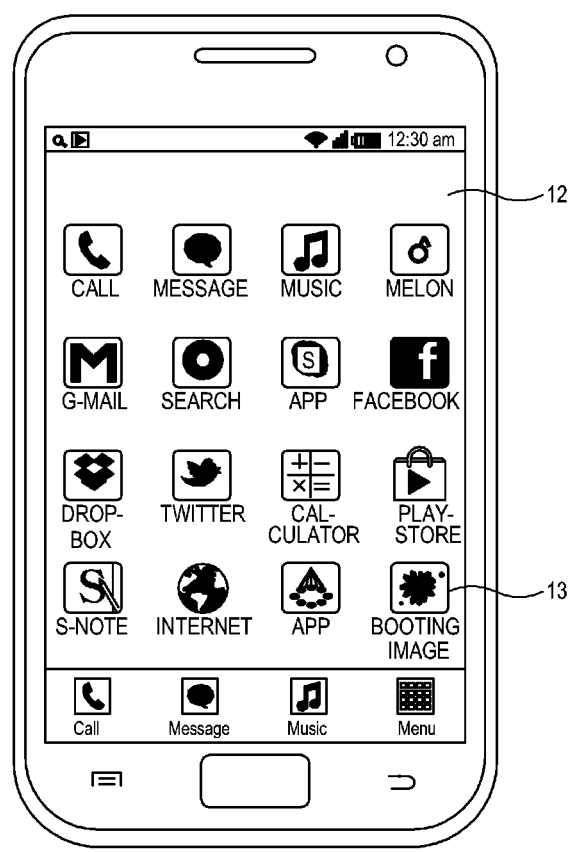
Figure 3A:
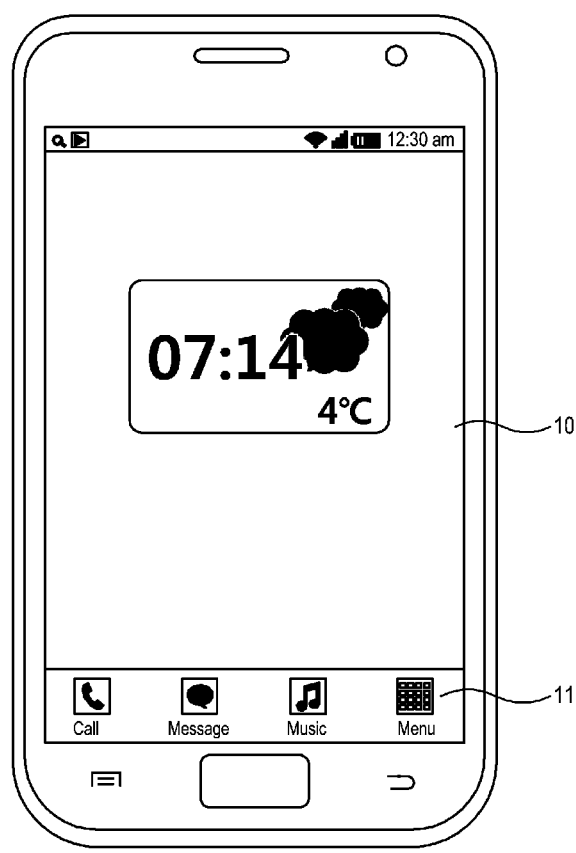
FIGS. 3A, 3B, 3C, and 3D illustrate another example of an operation of setting specific information to display when a mobile terminal is booted according to an embodiment of the present disclosure.
Figure 3B:
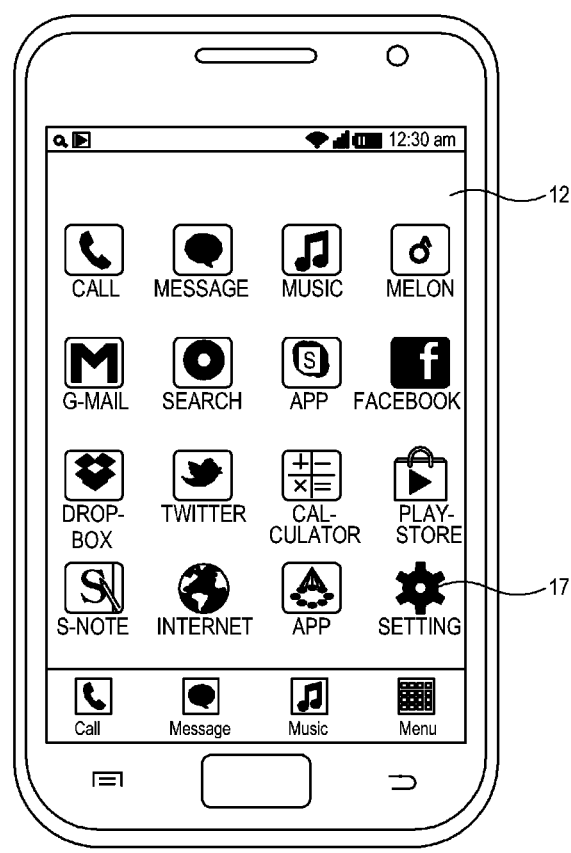
Figure 3C:
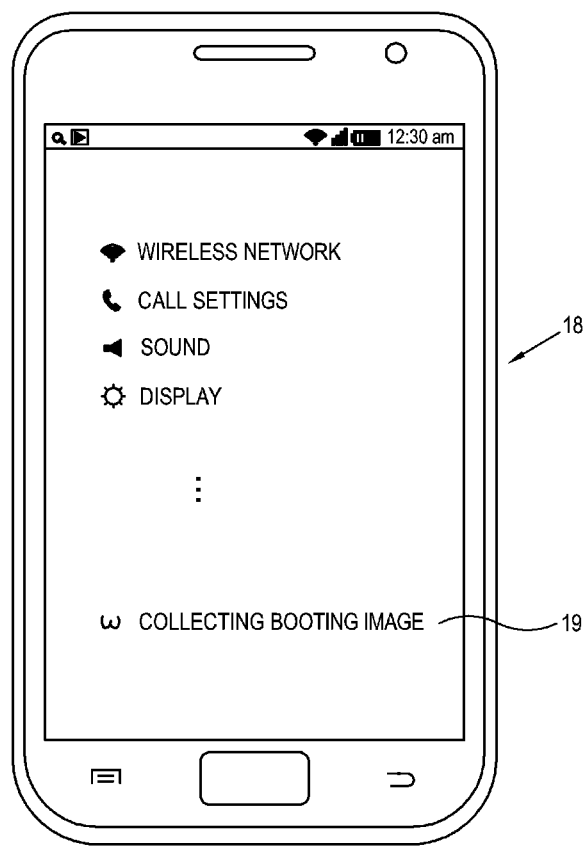

Here, the specific information collecting program 134 may include a booting image collecting application 13 of FIG. 2B and a booting image collecting program 19 of FIG. 3C included in a setting menu of a background service. The first execution image 136 may include the stored data related to the specific information and a display program to display the stored data on the display unit 110.

The data area 137 may store data generated by the controller 190 based on uses of the mobile terminal 100. For instance, the data area 137 may store the screens mentioned above with reference to the display unit 110, which are output to the display unit 110. Among these screens, the keypad screen and the menu screen may be configured as various types. That is, the keypad screen may provide a 3*4, a qwerty keypad, or any other similar and/or suitable keypad. The menu screen may include a screen switch key for switching screens, such as a return key for returning to a previous screen, and a control key for controlling an application currently running.

The second storage unit 140, as a working memory, temporarily loads various types of data including the booting code, command codes, the OS and applications to perform a variety of functions and stores temporary data generated while different programs are running. The second storage unit 140 may have a faster access speed than the first storage unit 130 and may be, for example, a Synchronous Dynamic Random Access Memory (SDRAM), or any other similar and/or suitable type of storage unit.

The wireless communication unit 150 forms a communication channel with the outside, i.e., an external electronic device, and functions to transmit and receive a wireless signal of data input and output through an antenna according to control by the controller 190. For instance, to transmit a wireless signal of data, the wireless communication unit 150 transmits the data after channel coding and spreading, followed by RF processing. To receive a wireless signal of data, the wireless communication unit 150 reconstructs the data by converting a received RF signal into a baseband signal and conducting de-spreading and channel-decoding on the baseband signal.

The audio processing unit 160 modulates an audio signal input via a Microphone (MIC) into audio data, and demodulates audio data input through the wireless communication unit 160 and audio data stored in the data area of the first storage unit 130 into an audio signal to be output as a sound through a Speaker (SPK) according to control by the controller 190.

The sensor unit 170 includes a proximity sensor 171 and an acceleration sensor 175. The proximity sensor 171 is disposed around the SPK to detect the SPK which approaches an object, for example, an ear of a user, and to transmit an object detecting signal to the controller 190. The controller 190 blocks supply of power to the touch screen 120 and the display unit 110 according to the object detecting signal when the mobile terminal 100 approaches the object, such as the ear of the user. The controller 190 supplies power to the touch screen 120 and the display unit 110 when the mobile terminal 100 becomes far away from the object. As a result, when the mobile terminal 110 approaches the object, power consumption of a battery unit 195, due to operating the touchscreen 120 and the display unit 110, may be prevented.

The acceleration sensor 170 detects a movement of the mobile terminal 100 and transmits a movement detecting signal to the controller 190 when the user moves the mobile terminal 100. The controller 190 displays an image while moving and/or scrolling the screen corresponding to the movement.

The camera unit 180, which may convert an optical signal into a video signal, may be provided as a camera module. The camera module processes image frames of a still image and/or video obtained by an image sensor in video call mode and/or camera mode. The processed image frames may be displayed on the display unit 110 according to control by the controller 190.

The controller 190 is a central processing unit of the mobile terminal 100, which controls and adjusts a series of processes of, for example, interpreting commands, calculating and comparing data, and receiving and processing data from various input devices and transmitting a processed result to an output device.

For instance, the controller 190 reads and implements and/or moves menu configuration information, including the OS of the mobile terminal 100 and a variety of applications, from the first storage unit 130 to the second storage unit 150. The controller 190 conducts processing and control for voice calls and data communications through the wireless communication unit 150 and controls power supply from the battery unit 195 to internal components.

The controller 190 may be configured as an integrated unit including a controller to control general operations of the mobile terminal 100 and flow of signals between components of the mobile terminal 100, a processor functioning to process data, and a peripheral device interface to control input and output between peripheral devices, such as the display unit 110, the touchscreen 120, the key input unit 125, the wireless communication unit 150, the audio processing unit 160, the sensor unit 170 and the camera unit 180, and the controller 190 and/or processor.

In addition to general functions, the controller 190 may periodically monitor and collect the specific information from the data generated by the controller 190 based on uses of the mobile terminal 100 and from the data stored in the data area of the first storage unit 130. The controller 190 may store the collected specific information in an information file, and may execute the information file storing the specific information to display the specific information on the display unit 110 according to the executive command of the booting code in booting.

In detail, first, the user sets the controller 190 to collect the specific information to be displayed in booting through a touch manipulation on the touch screen 125 as follows.

Figure 2C:
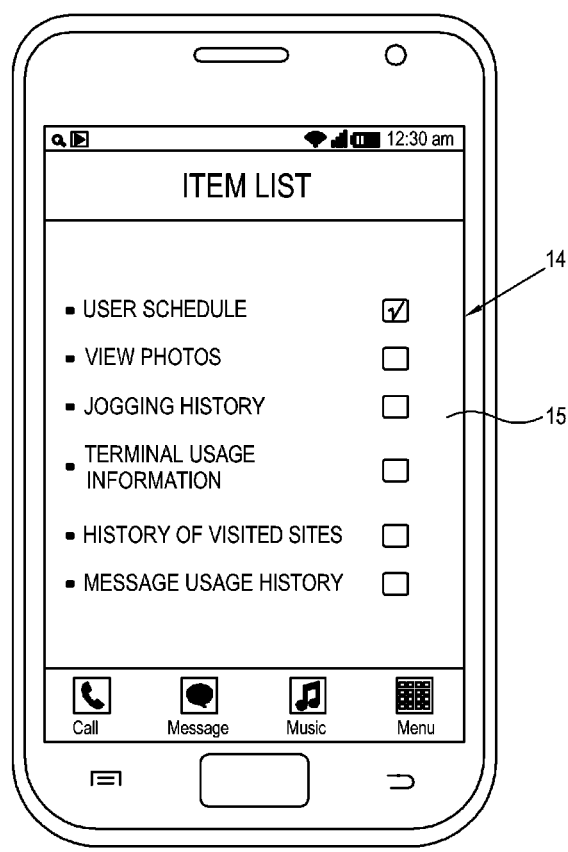

FIGS. 2A, 2B, and 2C illustrate an example of an operation of setting specific information to display when a mobile terminal is booted according to an embodiment of the present disclosure.

Referring to FIGS. 2A, 2B, and 2C, when the user selects a Menu icon 11, which may also be referred to as an App List icon 11, which is loaded from the data area of the first storage unit 130 to the second storage unit 140 and executed and displayed on a bottom of a home screen 10, and, as shown in FIG. 2B, the user selects an icon corresponding to the booting image collecting application 13 on a subsequently displayed menu screen 12, an item setting screen 15 including listed items to be monitored as needed by the user is displayed on an execution screen 14 of the booting image collecting application, as shown in FIG. 2C. Subsequently, the user selects at least one item corresponding to specific information desired to be displayed on the display unit 110 until the mobile terminal 100 gets ready to be normally used after booting, from among the listed items on the item setting screen 15. Here, the items may include User Schedule, View Photos, Jogging History, Terminal Usage Information, History of Visited Sites and/or Message Usage History.

FIGS. 3A, 3B, 3C, and 3D illustrate another example of an operation of setting specific information to display when a mobile terminal is booted according to an embodiment of the present disclosure.

Referring to FIGS. 3A, 3B, 3C, and 3D, the user may realize a setup operation of the controller 190 collecting the specific information displayed in booting, as follows.

Figure 3D:
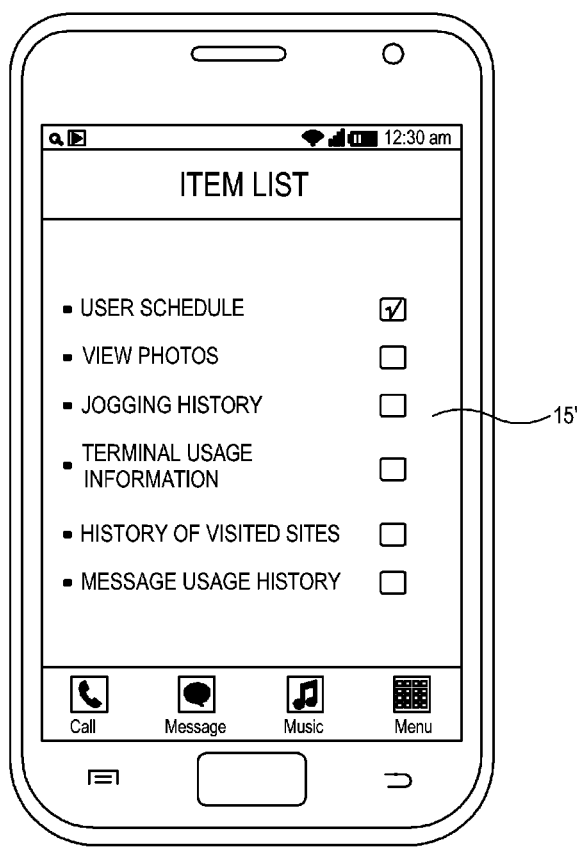

When the user selects the App List icon 11 displayed on the bottom of the home screen 10 and selects a Setting icon 17 on the subsequently displayed menu screen 12, as shown in FIG. 3B, setup programs including the booting image collecting program 19 are displayed on an execution screen 18 of a Setting menu, as shown in FIG. 3C. Subsequently, when the user selects the booting image collecting program 19 on the execution screen 18, an item setting screen 15' including listed items to be monitored as needed by the user is displayed, as shown in FIG. 3D. The user selects at least one item corresponding to specific information desired to be displayed on the display unit 110 when booting the mobile terminal 100 among the listed items on the item setting screen 15'.

When the at least one item is selected on the item setting screens 15 or 15' of the booting image collecting application 13 or the booting image collecting program 19, the controller 190 starts to monitor and collect data corresponding to the selected items from the data generated by the controller 190 based on uses of various functions and/or applications of the mobile terminal 100 and the data stored in the data area 137 of the first storage unit 130. Here, the controller 190 may monitor and collect the data based on a time period, for example, in various units such as in minutes, hours, days or weeks.

Then, when the data corresponding to the selected items is collected from the data stored in the data area 137, the controller 190 determines whether the collected data satisfies a storage condition for each selected item. The storage condition may be set in advance in manufacture of the terminal or, although not shown, may be designated for each item when the user selects an item on the item setting screens 15 or 15'.

For example, storage conditions for representative items may be set as listed in Table 1.

TABLE 1

| Item | Storage condition | ote |
|---|---|---|
| User Schedule | When at least one schedule is arranged for the next five days from today | |
| View Photos | When at least one picture or video was taken in the last five days | |
| Jogging History | When running at least 500 m or for at least ten minutes in the last five days | |
| Terminal Usage Information | When using an application at least once, making a phone call at least once or using a memory of at least 100 Kbytes in the last five days | |
| History of Visited Sites | When visiting sites at least five times in the last five days | |
| Message Usage History | When receiving and/or sending a message at least five times in the last five days | |

When the collected data satisfies the predetermined storage condition for each selected item, the controller 190 may process and/or edit the data according to a display type for the selected item. Here, the display type may be a text image, an image, a video, or any other similar type of information that may be displayed.

Figure 4B:
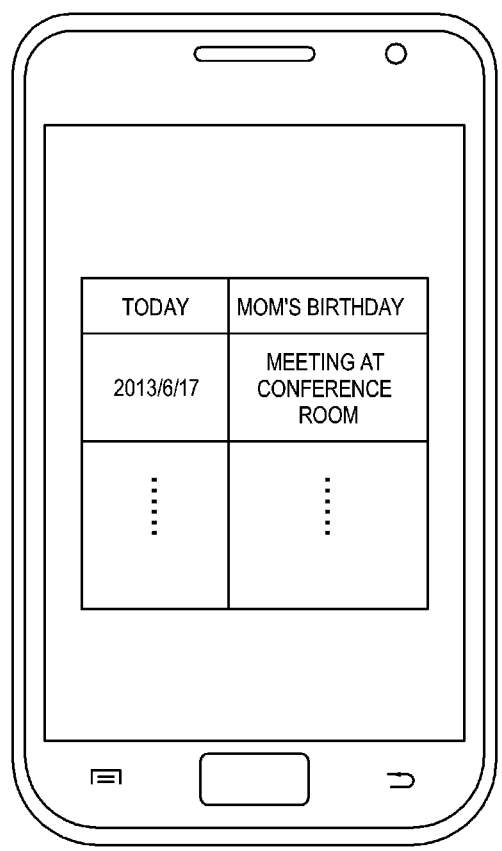

FIGS. 4A and 4B illustrate a display form of a selected item in booting in a case where a selected item is a User Schedule when setting specific information to display in booting according to an embodiment of the present disclosure.

Referring to FIGS. 4A and 4B, for the User Schedule, the collected data may be edited and/or processed so that a screen including a date and details of each schedule is displayed as a slide form, as shown in FIG. 4A, and/or a list of dates and details of schedules is displayed within one screen as shown in FIG. 4B.

Figure 5B:
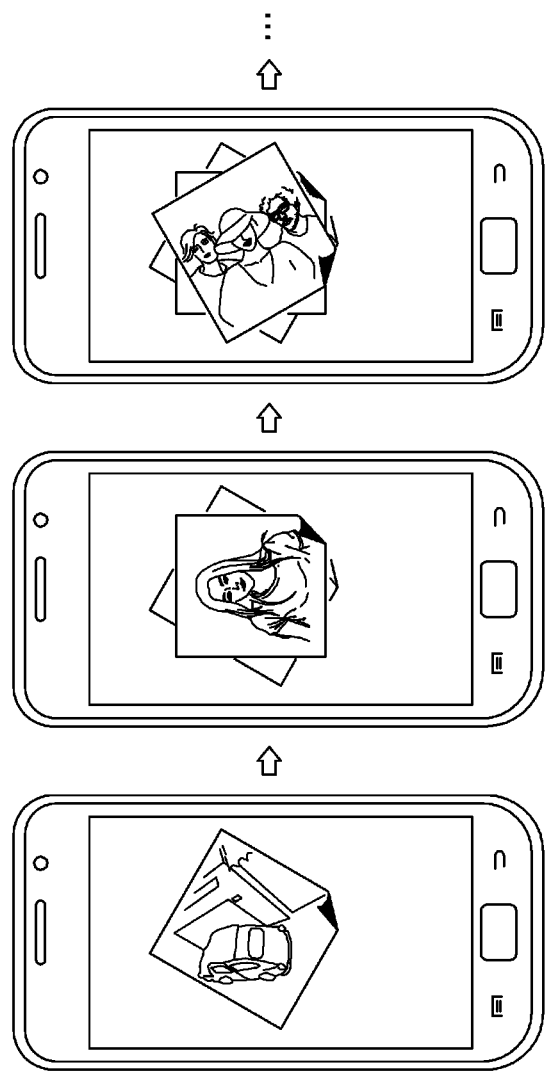

FIGS. 5A and 5B illustrate a display form of a selected item in booting in case where a selected item is View Photos when setting specific information to display on booting according to an embodiment of the present disclosure.

Referring to FIGS. 5A and 5B, for the View Photos, the collected data may be edited and/or processed so that a plurality of pictures is displayed as slides, as shown in FIG. 5A, and/or the pictures are dynamically displayed, one picture being sequentially superposed on other pictures, as shown in FIG. 5B.

Figure 6B:
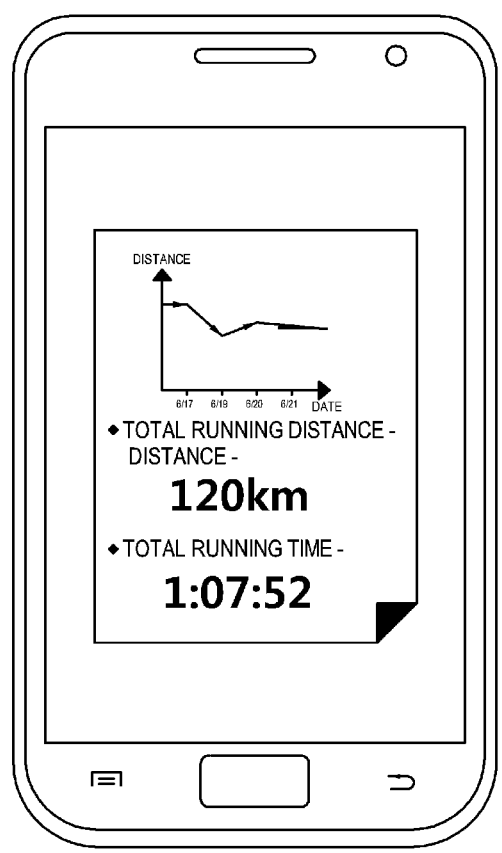

FIGS. 6A and 6B illustrate a display form of a selected item in booting in case where a selected item is Jogging History when setting specific information to display in booting according to an embodiment of the present disclosure.

Referring to FIGS. 6A and 6B, for the Jogging History, the collected data may be edited and/or processed so that a screen including a running route, running distance, running time and calorie consumption by date is displayed as a slide, as shown in FIG. 6A, and/or a graph of running distance and running time against date that changes as indicated by an arrow is displayed along with total running distance and total running time that change accordingly within one screen, as shown in FIG. 6B.

FIG. 7 illustrates a display form of a selected item in booting in case where a selected item is Terminal Usage Information when setting specific information to display at booting according to an embodiment of the present disclosure Referring to FIG. 7, for the Terminal Usage Information, the collected data may be edited and/or processed so that a most used application, a most frequent caller and a graph of memory usage against date are displayed as slides, as shown in FIG. 7.

For History of Visited Sites and Message Usage History, the collected data may be edited and/or processed to be displayed in the same manners.

The controller 190 may also edit and/or process the collected data so that each of the data of the selected items is displayed for a period of time in booting. For example, considering that it takes about 5 seconds for the mobile terminal 100 to get ready to be normally used after booting, a display time of each item may be properly adjusted so that a total display time of the selected items does not exceed 5 seconds.

Alternatively, when a display program is able to immediately display the collected data on the selected items without processing and/or editing, processing and/or editing of the collected data may be omitted.

Subsequently, the controller 190 may store the collected data as the first execution image 136 in the first section 133a of the program area 133 of the first storage unit 130. Here, the first execution image 136 includes the collected data and a display program to display the collected data. The display program may be a general-purpose display program capable of displaying an image as a slide or dynamically. Here, the controller 190 may store the first execution image 136 as an information file name, for example, bootimage.image, designated in advance in the executive command, for example, "run bootimage.image", to display the specific information recorded in the booting code. In this case, when a plurality of items is selected, first execution images of the respective items may be integrated and stored in the predetermined information file name, i.e., bootimage.image.

Alternatively, the controller 190 may generate an information file name to store the first execution image 136 of the selected items, may store the first execution image 136 in the generated information file name, and may change the booting code so as to include the generated information file name in the executive command for displaying the specific information about the selected items recorded in the booting code.

For instance, when a selected item is the User Schedule, the controller 190 generates an information file name of calendar.image, stores the first execution image 136 of the User Schedule in the generated information file name of calendar.image, and changes the booting code to include "run calendar.image" in the executive command of the booting code. In this case, when a plurality of items is selected, separate information file names may be generated for the respective items and first execution images of the items may be stored in the separate information file names, respectively. Further, the executive command of the booting code may be changed to include the separate information file names.

After the first execution image 136 of the selected items is stored, when the mobile terminal 100 is turn off and then on or is reset due to replacement of a battery or the like, the controller 190 may read and/or move the first execution image 136 including the data corresponding to the selected items from the first section 133a of the program area 133 of the first storage unit 130 to the second storage unit 140 and execute the first execution image 136 according to the executive command of the booting code at booting, thereby displaying the specific information about the data corresponding to the selected items on the display unit 110 as a text image, image, and/or video, as illustrated in FIGS. 4A to 7, through the display program.

Accordingly, the user may be provided with new specific information about a personally selected item in a dynamically changing form when the mobile terminal 100 is booted up. As a result, the user may not feel bored with waiting for the mobile terminal 100 to get ready to use after booting and may obtain information to enhance use of the mobile terminal 100.

If the mobile terminal 100 operates for the first time and/or if no item is selected corresponding to specific information to be displayed at booting when the mobile terminal 100 works again, the controller 190 may display guide information for guiding setup of an item in booting so as to indicate that the setup of the item is needed.

In detail, the controller 190 stores in advance the guide information for guiding the setup of the item in booting as the second execution image 138, for example, guideinformation.image, in the first section 133a of the program area 133 of the first storage unit 130, like the first execution image 136 of the specific information.

Figure 8:
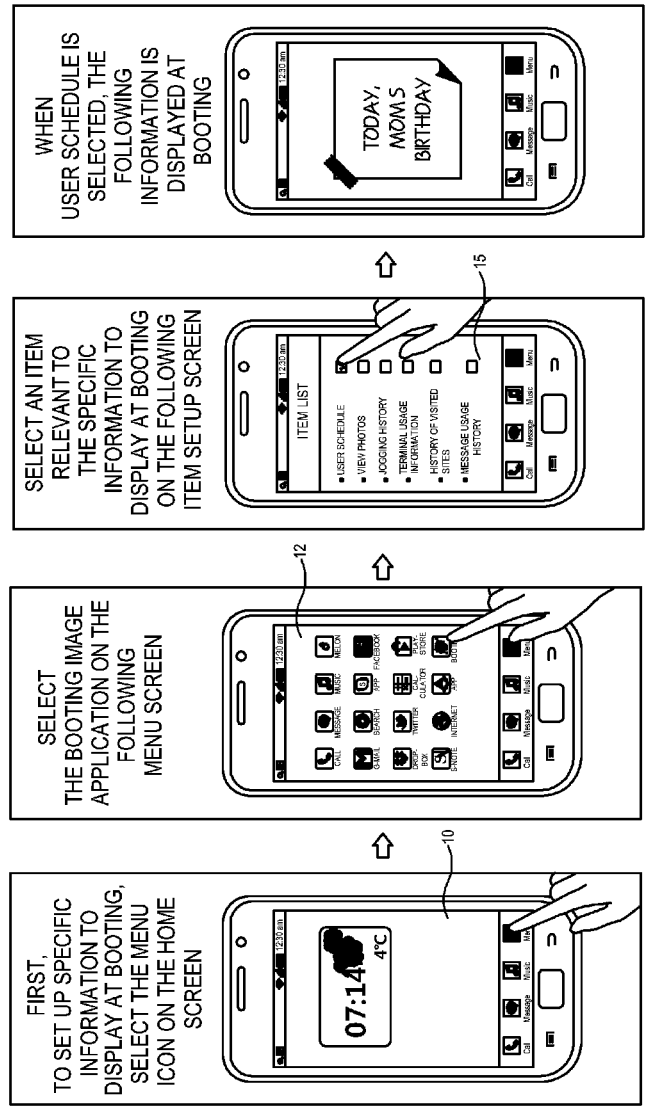
FIGS. 8, 9A, and 9B illustrate guide information describing operations of setting specific information to display in booting as illustrated in FIGS. 2A to 2C and 3A to 3D, respectively according to an embodiment of the present disclosure.
Figure 9A:
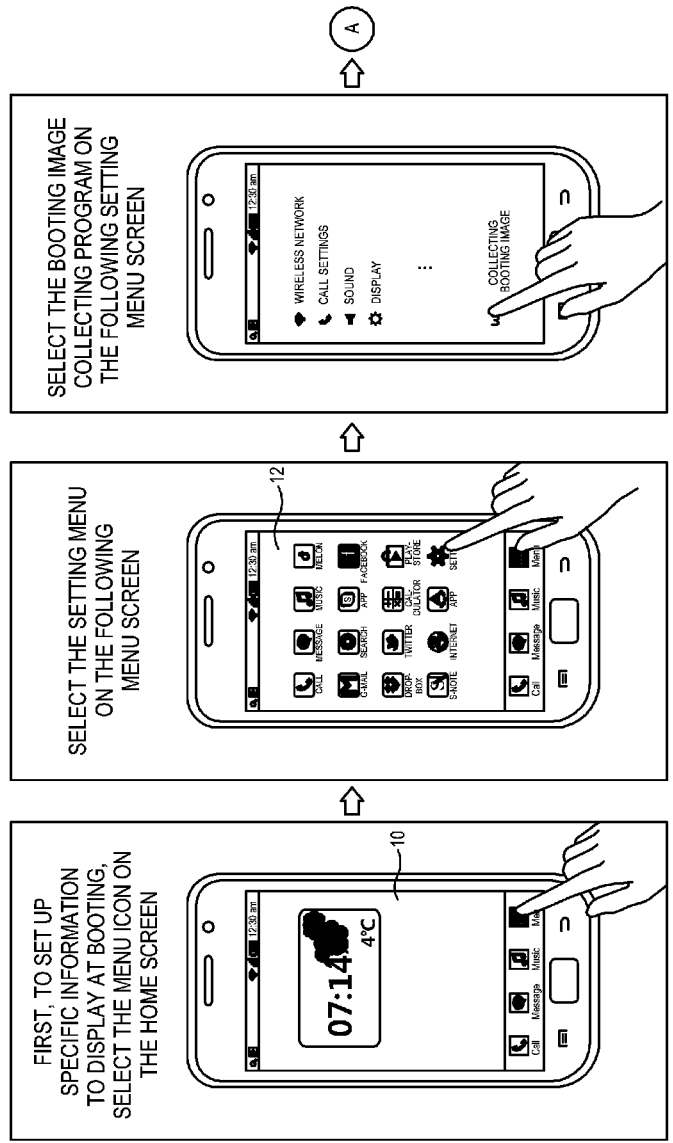
Figure 9B:
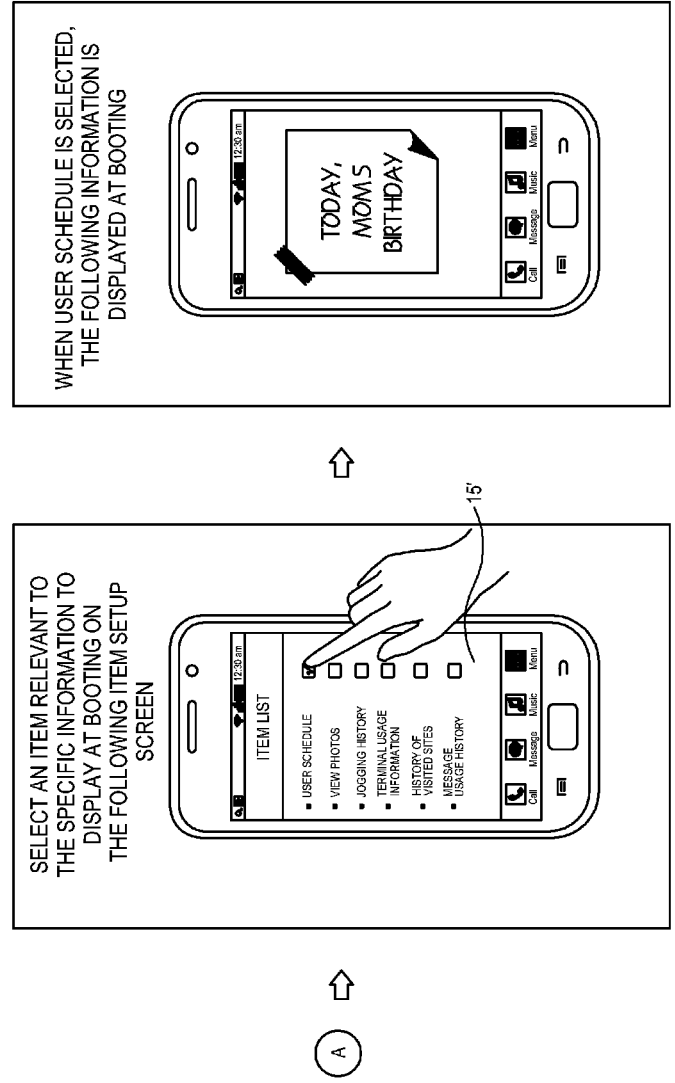

FIGS. 8, 9A, and 9B illustrate guide information describing operations of setting specific information to display in booting as illustrated in FIGS. 2A to 2C and 3A to 3D, respectively according to an embodiment of the present disclosure.

Referring to FIGS. 8, 9A and 9B, the guide information includes details of the setup operation for allowing the controller 190 to collect the specific information displayed in booting illustrated with reference to FIGS. 2A to 2C and 3A to 3D.

Meanwhile, the booting code includes an executive command to execute the second execution image 138 of the guide information if the mobile terminal 100 operates for the first time and/or if no item is selected corresponding to the specific information to be displayed at booting when the mobile terminal 100 works again.

Accordingly, if the mobile terminal 100 operates for the first time and/or if no item is selected corresponding to the specific information to be displayed in booting when the mobile terminal 100 works again, the controller 190 may read and/or move the second execution image 138 including the guide information from the first section 133a of the program area 133 of the first storage unit 130 to the second storage unit 140 and execute the second execution image 138 according to the executive command of the booting code in booting, thereby displaying the guide information on the display unit 110.

Alternatively, the controller 190 may further display progress of a booting process in booting. To this end, a progress display program (not shown) showing progress of the booting process which is implemented by the controller 190 at booting may be installed in the first section 133a of the program area 133 of the first storage unit 130. Here, the progress of the booting process may be displayed with a bar (not shown) at a bottom of the screen of the mobile terminal 100. Further, the booting code includes an executive command for the controller 190 to execute the progress display program and to display the progress of the booting process on the display unit 110 in booting.

When the progress of the booting process is further displayed on the display unit 110 in booting, the bar showing the progress of the booting process enables the user to easily estimate how long it takes the mobile terminal 100 to get ready to use after booting.

In addition, the controller 190 may further display an advertisement at booting in partnership with sponsors of a mobile terminal manufacturer and/or a communications service provider. To this end, a plurality of advertisements to be implemented by the controller 190 at booting is stored in advance as third execution images (not shown) in the first section 133a of the program area 133 of the first storage unit 130. Further, an advertisement selecting program that the controller 190 executes when the mobile terminal 100 operates is stored in the first section 133a of the program 133. When the mobile terminal 100 operates, the controller 190 may execute the advertisement selecting program, may periodically analyze an Internet search history of the user included in the data created based on uses of the mobile terminal 100 to select an advertisement relevant to a search term with a high frequency of search among the stored advertisements, and may change and/or update the booting code so that the controller 190 implements an execution image of the selected advertisement at booting. The booting code includes an executive command for the controller 190 to execute the third execution image of the selected advertisement and to display the selected advertisement on the display unit 110 at booting.

When the advertisement relevant to the search term with a high frequency of search is selectively provided to the user based on the Internet search history, the user may receive the advertisement relevant to the search term frequently used by the user to do a search on the Internet with more familiarity than other advertisements, thereby achieving optimal advertising effects.

As described above, the mobile terminal 100, according to an embodiment, stores the specific information collecting program 134 and the first execution image 136, the second execution image 138 and the third execution image in the first section 133a of the program area 133 of the first storage unit 130. Alternatively, the specific information collecting program 134 and the first execution image 136, the second execution image 138 and the third execution image may be stored in the second section 133b of the program area 133 depending on a design.

Hereinafter, a method of displaying information when booting the mobile terminal 100 according to an embodiment will be described with reference to FIG. 10.

Figure 10:
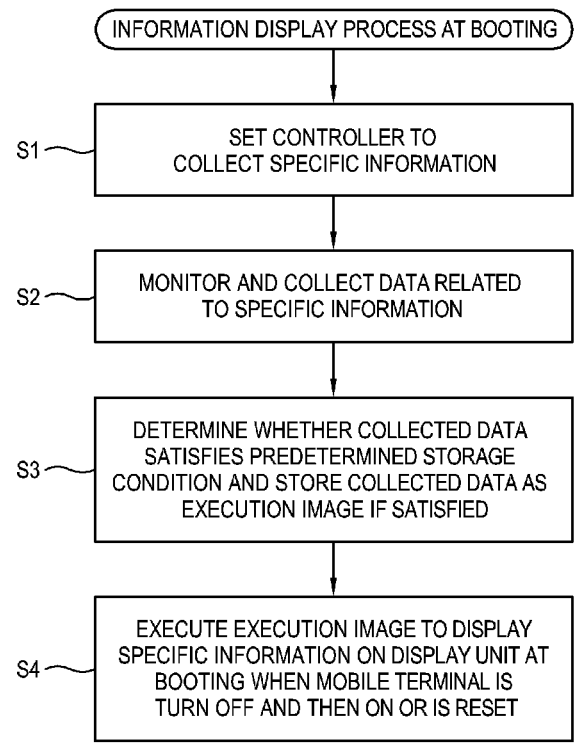
FIG. 10 is a flowchart illustrating an information display method in booting a mobile terminal according to an embodiment of the present disclosure.

FIG. 10 is a flowchart illustrating an information display method in booting a mobile terminal according to an embodiment of the present disclosure.

Referring to FIG. 10, first, at operation S1, the user sets the controller 190 to collect specific information displayed on the display unit 110 in booting the mobile terminal 100 through a touch manipulation on the touch screen 125 while the mobile terminal 100 is operating. Here, the user selects at least one item related to specific information desired to be displayed on the display unit 110, for example, the User Schedule, using one of the methods illustrated above in FIGS. 2A to 2C and FIGS. 3A to 3D.

When the item related to the specific information, that is, the User Schedule, is selected, the controller 190 monitors and collects data corresponding to the specific information, that is, the User Schedule, at operation S2, according to a time period, for example, on a 2-hour period, from among the data generated by the controller 190 based on uses of various functions and/or applications of the mobile terminal 100 and the data stored in the data area 137 of the first storage unit 130.

The controller 190, at operation S3, determines whether the collected data satisfies a storage condition for the User Schedule, for example, whether at least one schedule is arranged for the next five days from today, and if satisfied, stores the collected data and a display program to display the collected data as a first execution image 136 in the first section 133a of the program area 133 of the first storage unit.

Here, when the display program is unable to immediately display the collected data, the controller 190 may process and/or edit the collected data into a predetermined display form for the User Schedule. For instance, the collected data may be edited so that a screen including a date and details of each schedule is displayed as a slide form, as shown in FIG. 4A, or a list of dates and details of schedules is displayed within one screen, as shown in FIG. 4B.

Further, the controller 190 stores the first execution image 136 as an information file name, for example, bootimage.image, designated in advance in an executive command, for example, "run bootimage.image", for displaying the specific information related to the User Schedule recorded in a booting code. Alternatively, the controller 190 may generate an information file name of calendar.image, may store the first execution image 136 of the User Schedule in the generated information file name of calendar.image, and may change the booting code to include "run calendar.image" in the executive command of the booting code.

After the first execution image 136 of User Schedule is stored, when the mobile terminal 100 is turned off and then on or is reset due to replacement of a battery or the like, at operation S4, the controller 190 may read and/or move the first execution image 136 of the User Schedule from the program area 133 of the first storage unit 130 to the second storage unit 140 and execute the first execution image 136 according to the executive command of the booting code at booting, thereby displaying the specific information related to of the User Schedule on the display unit 110 as a slide or text, as illustrated in FIGS. 4A and 4B, through the display program.

Here, when the mobile terminal 100 is completely booted up and is ready to use while the specific information is being displayed on the display unit, the controller 190 finishes displaying the specific information and then displays the home screen.

Further, if the mobile terminal 100 operates for the first time after being released from a manufacturer and/or if no item is selected corresponding to specific information to be displayed at booting when the mobile terminal 100 works again, the controller 190 may execute the second execution image 138 stored in advance in the first section 133a of the program area 133 of the first storage unit 130 according to the executive command of the booting code and may display guide information for guiding setup of an item, as illustrated in FIG. 8 or FIGS. 9A and 9B.

Alternatively, in operation S4, the controller 190 may execute a progress display program stored in advance in the first section 133a of the program area 133 of the first storage unit 130 according to the executive command of the booting code and may further display progress of a booting process at booting. Here, the progress of the booting process may be displayed with a bar at a bottom of the screen of the electronic apparatus.

In addition, the method of displaying the information according to an embodiment may further display an advertisement at booting.

Hereinafter, a method of further displaying an advertisement at booting will be described with reference to FIG. 11.

Figure 11:
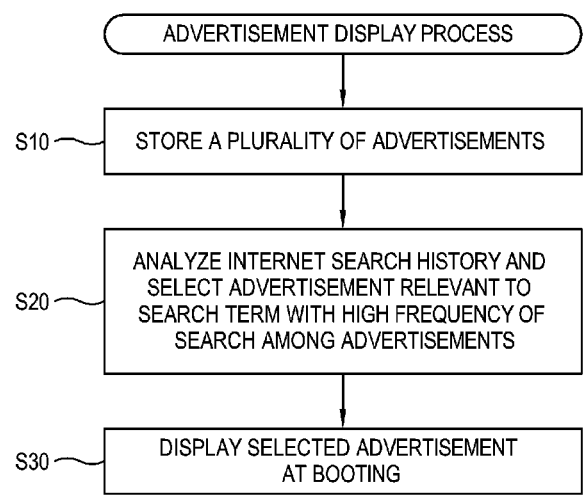
FIG. 11 is a flowchart illustrating an advertisement display method added to an information display method in booting a mobile terminal according to an embodiment of the present disclosure.

FIG. 11 is a flowchart illustrating an advertisement display method added to an information display method in booting a mobile terminal according to an embodiment of the present disclosure.

First, a plurality of advertisements is stored in advance as third execution images (not shown) in the first section 133a of the program area 133 of the first storage unit 130 at operation S10.

The controller 190 periodically analyzes an Internet search history of the user included in the data created when the mobile terminal 100 operates and the data stored in the data area 137 of the first storage unit 130 in order to select an advertisement relevant to a search term with a high frequency of search from among the stored advertisements, and changes and/or updates a booting code so that the controller 190 implements an execution image of the selected advertisement in booting at operation S20.

When the mobile terminal 100 is turned off and then on and/or is reset due to replacement of a battery or the like, the controller 190 executes the third execution image according to an executive command of the booting code to further display the selected advertisement at operation S30.

As described above, the method of displaying the information at booting, and the electronic apparatus and the mobile terminal 100 using the same according to the various embodiments may dynamically display specific information monitored and collected as needed by the user when the mobile terminal 100 operates, instead of information according to the related art, such as logos of a mobile terminal manufacturer or a communications service provider, until the mobile terminal 100 is booted up to get ready to use, so that the user may not feel bored with waiting for booting time and may obtain information.

Moreover, when information on progress of a booting process is further displayed until the mobile terminal 100 gets ready to use after booting, the user may estimate how long it takes the mobile terminal 100 to get ready to use.

In addition, a plurality of advertisements is stored in advance in partnership with sponsors of a mobile terminal manufacturer or a communications service provider, an Internet search history of the user included in data created when the mobile terminal 100 operates is periodically analyzed in order to select an advertisement relevant to a search term with a high frequency of search from among the stored advertisements, and the selected advertisement is further displayed to the user at booting, thereby providing a customized advertisement for the user and achieving optimal advertising effects.

While the present disclosure has been shown and described with reference to various embodiments thereof, it will be understood by those skilled in the art that various changes in form and details may be made therein without departing from the spirit and scope of the present disclosure, as defined by the appended claims and their equivalents.

What is claimed is:

1. A method of displaying information when an electronic apparatus is booted, the method comprising:
   displaying a setting screen comprising a plurality of items for selecting specific information according to a user's input;
   selecting at least one item from among the plurality of items according to a user's input on the setting screen;
   monitoring and collecting specific information corresponding to the selected at least one item from data created when the electronic apparatus operates;
   determining whether the collected specific information satisfies at least one storage condition corresponding to the selected at least one item from among a plurality of storage conditions, each of which is configured to be set for the plurality of items, respectively;

in response to the collected specific information satisfying the at least one storage condition, generating an information file name corresponding to the selected at least one item for storing the collected specific information and storing the collected specific information as an execution image in the generated information file name when the collected data satisfies the storage condition for the selected at least one item;

changing a booting code to comprise the generated information file name in an executive command for displaying the collected specific information recorded in the booting code; and executing the at least one information file storing the collected specific information as the execution image during booting of the electronic apparatus and displaying the collected specific information, wherein when a plurality of items is selected, separate information file names are generated for the respective items and execution images of the items are respectively stored in the separate information file names.

2. The method of claim 1, wherein the monitoring and collecting comprises periodically monitoring and collecting data related to the selected at least one item from the data created when the electronic apparatus operates.

3. The method of claim 1, wherein the execution image comprises the collected specific information and a display program to display the collected specific information.

4. The method of claim 1, wherein the storing of the collected specific information as the execution image comprises storing the execution image as an information file name designated in advance in an executive command for displaying the collected specific information recorded in a booting code.

5. The method of claim 4, wherein when a plurality of items is selected, execution images of the respective items are stored in an integrated manner in one place that is the designated information file name.

6. The method of claim 1, further comprising:
further displaying progress of a booting process while booting the electronic apparatus.

7. The method of claim 1, further comprising:
storing a plurality of advertisements in advance;
analyzing Internet search history of a user comprised in the data created when the electronic apparatus operates to select an advertisement relevant to a search term with a high frequency of search among the stored advertisements; and
displaying the selected advertisement in booting.

8. An electronic apparatus comprising:
a display unit configured to display an image;
a storage unit configured to store a booting code and data created when the electronic apparatus operates; and
a controller configured to:
display a setting screen comprising a plurality of items for selecting specific information on the display unit according to a user's input,
select at least one item from among the plurality of items according to a user's input on the setting screen,
periodically monitor and collect specific information corresponding to the selected at least one item from the stored data,
determine whether the collected specific information satisfies at least one storage condition corresponding to the selected at least one item from among a plurality of storage conditions, each of which is configured to be set for the plurality of items, respectively,
in response to the collected specific information satisfying the at least one storage condition, generate an information file name corresponding to the selected at least one item for storing the collected specific information and store the collected specific information as an execution image in the generated information file name when the collected data satisfies the storage condition for the selected at least one item,
change the booting code to comprise the generated information file name in the executive command for displaying the collected specific information recorded in the booting code, and
execute the at least one information file storing the collected specific information as the execution image, according to an executive command of the booting code during booting of the electronic apparatus and to display the collected specific information on the display unit,
wherein when a plurality of items is selected, the controller is configured to generate separate information file names for the respective items and to respectively store execution images of the items in the separate information file names.

9. The electronic apparatus of claim 8, wherein, when an item to collect is selected by a user input through a booting image collecting program, the controller is configured to periodically monitor and collect data related to the selected at least one item from the data created when the electronic apparatus operates to store the collected data as the execution image, and to execute the execution image according to an executive command of the booting code during booting of the electronic apparatus to display the stored data of the execution image on the display unit.

10. The electronic apparatus of claim 9, wherein the controller is configured to store the execution image as an information file name designated in advance in the executive command for displaying the collected specific information recorded in the booting code.

11. The electronic apparatus of claim 8, wherein the controller is further configured to display progress of a booting process.

12. The electronic apparatus of claim 8, wherein the controller stores a plurality of advertisements in advance, analyzes Internet search history of a user comprised in the data created when the electronic apparatus operates to select an advertisement relevant to a search term with a high frequency of search among the stored advertisements, and displays the selected advertisement at booting.

13. The electronic apparatus of claim 8, wherein when a plurality of items is selected, execution images of the respective items are stored in an integrated manner in one place that is a designated information file name.

* * * * *